(12) United States Patent
Okuzono

(10) Patent No.: US 8,310,690 B2
(45) Date of Patent: Nov. 13, 2012

(54) IMAGE READING APPARATUS

(75) Inventor: Taisei Okuzono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 566 days.

(21) Appl. No.: 12/639,742

(22) Filed: Dec. 16, 2009

(65) Prior Publication Data

US 2010/0165423 A1 Jul. 1, 2010

(30) Foreign Application Priority Data

Dec. 25, 2008 (JP) ................... 2008-330245

(51) Int. Cl.
*H04N 1/46* (2006.01)
*H04N 9/73* (2006.01)
*G06K 15/00* (2006.01)

(52) U.S. Cl. ....... 358/1.12; 358/529; 358/516; 358/474; 348/223.1

(58) Field of Classification Search .................. 382/124, 382/153, 274; 345/102; 348/223.1, 222.1; 358/461, 465, 1.12, 529, 516, 474
See application file for complete search history.

(56) References Cited

U.S. PATENT DOCUMENTS

| 7,825,956 | B2 * | 11/2010 | Sumida ..................... 348/223.1 |
| 2005/0029352 | A1 | 2/2005 | Spears |
| 2005/0093991 | A1 * | 5/2005 | Yokohata et al. .......... 348/222.1 |
| 2006/0204062 | A1 * | 9/2006 | Shigeta ..................... 382/124 |
| 2006/0245013 | A1 | 11/2006 | Ikeno et al. |
| 2006/0250661 | A1 | 11/2006 | Susaki |
| 2007/0013786 | A1 * | 1/2007 | Chiba et al. ................. 348/222.1 |
| 2007/0195193 | A1 * | 8/2007 | Kawakami .................... 348/371 |
| 2007/0268241 | A1 * | 11/2007 | Nitta et al. .................... 345/102 |
| 2008/0112017 | A1 | 5/2008 | Nagasaka |
| 2008/0123163 | A1 | 5/2008 | Nakano et al. |
| 2008/0211925 | A1 * | 9/2008 | Misawa et al. ............. 348/223.1 |

FOREIGN PATENT DOCUMENTS

| EP | 1926300 A2 | 5/2008 |
| GB | 2405045 A | 2/2005 |
| JP | H05-014712 A | 1/1993 |
| JP | 2002-185796 A | 6/2002 |
| JP | 2006-311175 A | 11/2006 |
| JP | 2006-311219 A | 11/2006 |
| JP | 2006-311316 A | 11/2006 |
| JP | 2008-124788 A | 5/2008 |
| JP | 2008-160807 A | 7/2008 |

OTHER PUBLICATIONS

European Patent Office; Extended European Search Report for European Patent Application No. 09252853, dated Oct. 15, 2010. (counterpart to above-captioned U.S. patent application).

(Continued)

*Primary Examiner* — Jerome Grant, II
(74) *Attorney, Agent, or Firm* — Baker Botts L.L.P.

(57) ABSTRACT

The presence or absence of outside light is individually decided with respect to each of the time of executing AFE adjusted value acquiring processing, the time of executing LED adjusted value acquiring processing and the time of executing black correction data acquiring processing. In the case of deciding that the outside light is present, a parameter in the case of deciding that the outside light is present is modified to a predetermined value or a reacquired value. As a result of this, even when an incident state of outside light changes at the time of acquiring each of the parameters, it can properly be switched whether or not their parameters are replaced with the predetermined value or the reacquired value.

6 Claims, 11 Drawing Sheets

OTHER PUBLICATIONS

Japan Patent Office, Office Action for Japanese Patent Application No. 2008-330245 (counterpart to above-captioned patent application), issued Aug. 16, 2011.

Japan Patent Office, Notification of Reason for Refusal for Patent Application No. JP 2008-330245 (counterpart to above-captioned patent application), mailed Dec. 14, 2010.

* cited by examiner

READING DEVICE OUTPUT VALUE AT TIME OF TURNING OFF LED

READING DEVICE OUTPUT VALUE AT TIME OF TURNING ON LED

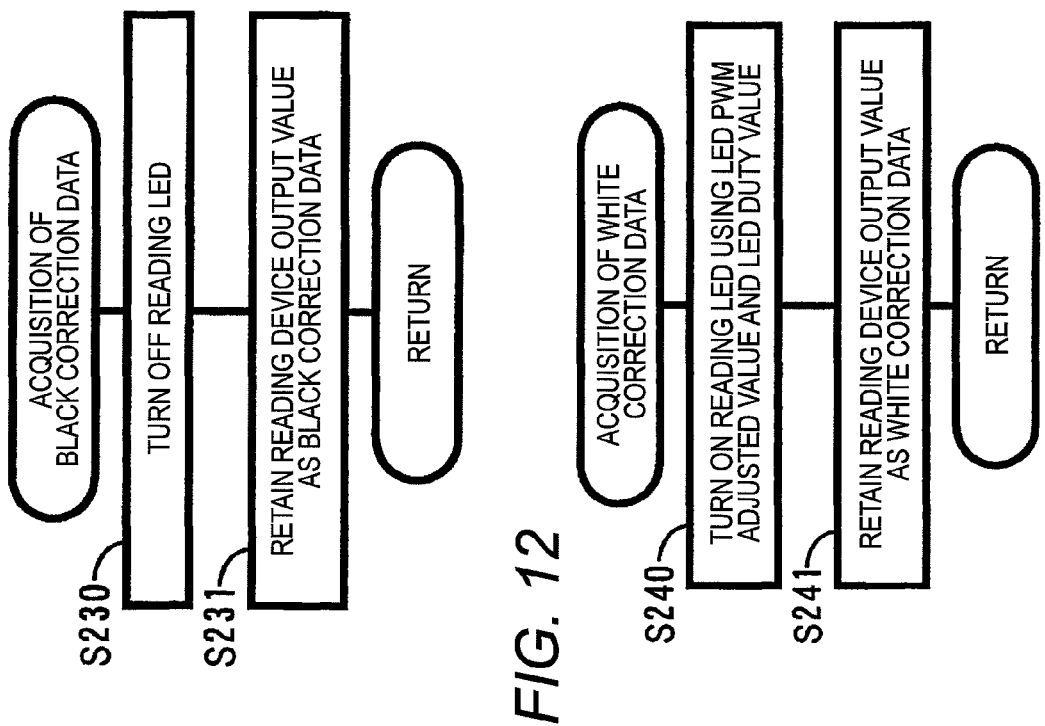
FIG. 11
FIG. 12
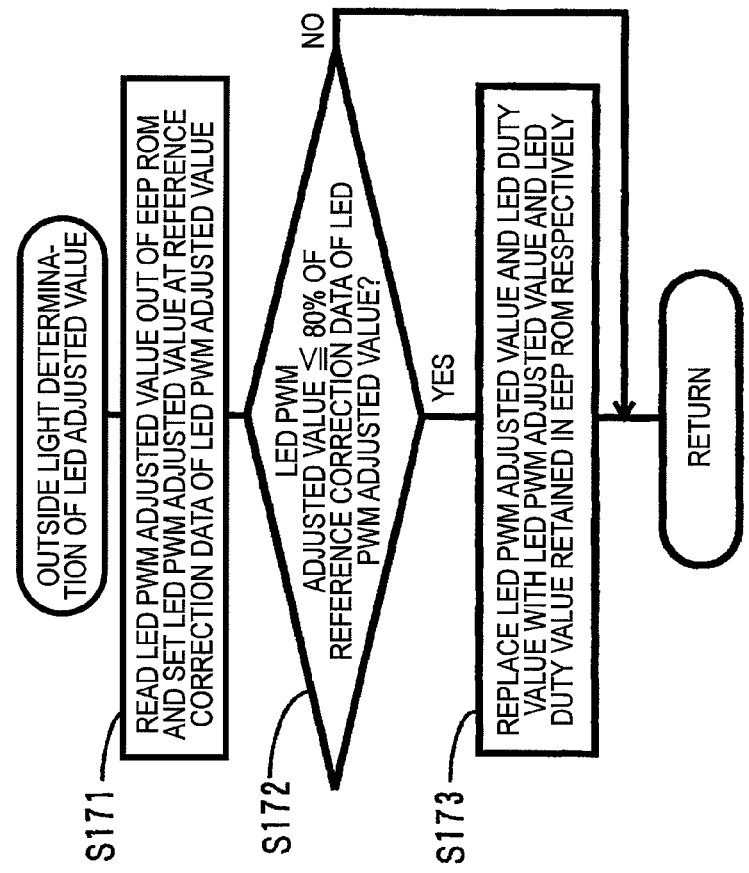
FIG. 10

IMAGE READING APPARATUS

CROSS REFERENCE TO RELATED APPLICATION

The present application claims priority from Japanese Patent Application No. 2008-330245 filed on Dec. 25, 2008, the disclosure of which is incorporated herein by reference in its entirety.

BACKGROUND

The present invention relates to an image reading apparatus for reading an image of an original placed on an original placement table, and particularly to an image reading apparatus capable of eliminating an influence of outside light.

An image reading apparatus for irradiating an original placed on an original placement table with light from a light source and reading an image of the original based on reflected light reflected by its original has been contemplated conventionally. In this kind of image reading apparatus, when light (the so-called outside light) from the outside of the image reading apparatus enters the periphery of an original, this affects a detection result of the reflected light. Therefore, a proposal to detect the presence or absence of outside light based on a light amount adjusted value obtained at the time when light from a light source is gradually intensified in a state of opposing a light receiving element for detecting the reflected light to a reference member and use a predetermined light amount set value in the case of the presence of the outside light has been made.

In the related art, white level data obtained based on an output of a light receiving element with respect to reflected light reflected by the reference member after being irradiated with light from a light source adjusted by the light amount adjusted value is used as data in which outside light similar to that at the time of acquiring the light amount adjusted value is reflected as it is.

SUMMARY

However, incident states of outside light may change at the time of acquiring a light amount adjusted value (hereinafter also called a light source adjusted value) and the time of acquiring white level data (hereinafter also called white correction data), and the related apparatus cannot cope with such a change in the incident states of outside light. Therefore, an object of the invention is to provide an image reading apparatus using a proper value in various parameters such as a light source adjusted value or white correction data according to a change in an incident state of outside light at the time of each adjustment.

An image reading apparatus of the invention implemented to achieve the object is characterized by an image reading apparatus comprising:

an original placement table on which an original is to be placed;

a light source which irradiates the original placed on the original placement table with light;

an image reader which reads an image of the original based on light reflected from the original when the original is irradiated by the light source;

a reference member used as a lightness reference of the image reader;

an adjusted value acquiring unit which acquires a light source adjusted value for adjusting the light source based on a read result at the time when the image reader reads light reflected from the reference member irradiated by the light source;

a white correction data acquiring unit which acquires, as white correction data, a read result at the time when the image reader reads the light reflected from the reference member irradiated by the light source which is adjusted by the light source adjusted value;

a black correction data acquiring unit which acquires, as black correction data, a read result at the time when the image reader reads the light reflected from the reference member at the time of turning off the light source;

a first outside light deciding unit which decides whether outside light entering the original table is present or absent based on the light source adjusted value;

an adjusted value modifying unit which modifies the light source adjusted value from the light source adjusted value acquired by the adjusted value acquiring unit to a predetermined light source adjusted value when the first outside light deciding unit decides that the outside light is present;

a second outside light deciding unit which decides whether outside light entering the original table is present or absent based on the white correction data and the black correction data;

a black correction data modifying unit which modifies the black correction data from black correction data acquired by the black correction data acquiring unit to predetermined black correction data when the second outside light deciding unit decides that the outside light is present, and does not modify the black correction data when the second outside light deciding unit decides that the outside light is absent; and a read result correcting unit which corrects a read result in which the image reader reads the light reflected by the original based on the white correction data and the black correction data output from the black correction data modifying unit.

Further, the invention may be characterized by comprising:

an original placement table on which an original is to be placed;

a light source which irradiates the original placed on the original placement table with light;

an image reader which reads an image of the original based on light reflected by the original when the original is irradiated by the light source;

a reference member used as a lightness reference of the image reader;

a adjusted value acquiring unit which acquires a light source adjusted value for adjusting the light source based on a read result at the time when the image reader reads light reflected from the reference member when the reference member is irradiated by the light source;

a white correction data acquiring unit which acquires, as white correction data, a read result at the time when the image reader reads the light reflected from the reference member when the reference member is irradiated by the light source adjusted by the light source adjusted value;

a black correction data acquiring unit which acquires, as black correction data, a read result at the time when the image reader reads the light reflected from the reference member at the time of turning off the light source;

a first outside light deciding unit which decides whether outside light entering the original table is present or absent based on the light source adjusted value acquired by the adjusted value acquiring unit;

a light source adjusted value modifying unit which modifies the light source adjusted value from the light source adjusted value acquired by the light source adjusted value acquiring unit to a predetermined light source adjusted value when the first outside light deciding unit decides that the outside light is present;

a second outside light deciding unit which decides whether outside light entering the original table is present or absent based on white correction data acquired by the white correction data acquiring unit and the black correction data acquired by the black correction data acquiring unit;

a black correction data reacquiring unit which reacquires, as the black correction data, the read result of the image reader obtained at the time of turning off the light source after the image reader is moved to a position in which an influence of outside light is not suffered when the second outside light deciding unit decides that the outside light is present;

a black correction data modifying unit which modifies the black correction data from black correction data acquired by the black correction data acquiring unit to black correction data reacquired by the black correction data reacquiring unit when the second outside light deciding unit decides that the outside light is present and does not modify the black correction data when the outside light is absent; and a read result correcting unit which corrects the read result in which the image reader reads reflected light reflected by the original based on the white correction data and the black correction data output from the black correction data modifying unit.

BRIEF DESCRIPTION OF THE DRAWINGS

FIG. 10 is a flowchart representing outside light determining processing of an LED adjusted value in the main routine.

FIG. 11 is a flowchart representing black correction data acquiring processing in the main routine.

FIG. 12 is a flowchart representing white correction data acquiring processing in the main routine.

DETAILED DESCRIPTION OF EXEMPLARY EMBODIMENTS

Configuration of Image Reading Apparatus

Figure 1A:
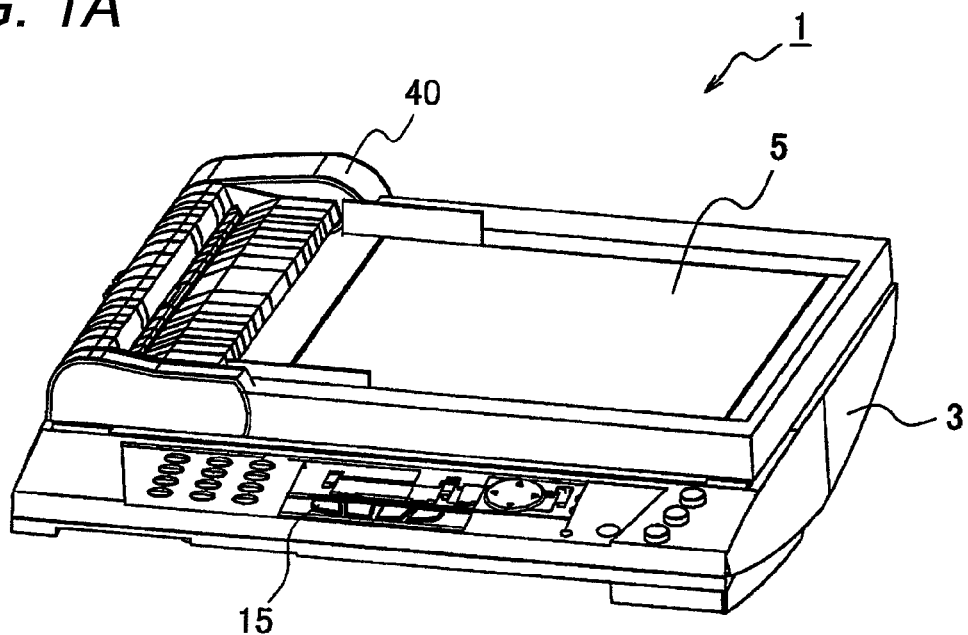
FIGS. 1A and 1B are external appearance views representing a configuration of an image reading apparatus to which the invention is applied.

An embodiment of the invention will hereinafter be described along with the drawings. In addition, FIG. 1 is an external appearance view representing a configuration of an image reading apparatus 1 to which the invention is applied, and FIG. 2 is a plan view representing an upper configuration of an apparatus body 3 in its image reading apparatus 1.

The image reading apparatus 1 of the present embodiment is constructed as a scanner apparatus of the so-called flatbed type, and is made of the apparatus body 3 comprising a second reading surface 12 and a first reading surface 11 as one example of an original placement table in the upper portion, and an FB cover 5 as one example of a cover disposed openably and closably over the apparatus body 3.

Figure 1B:
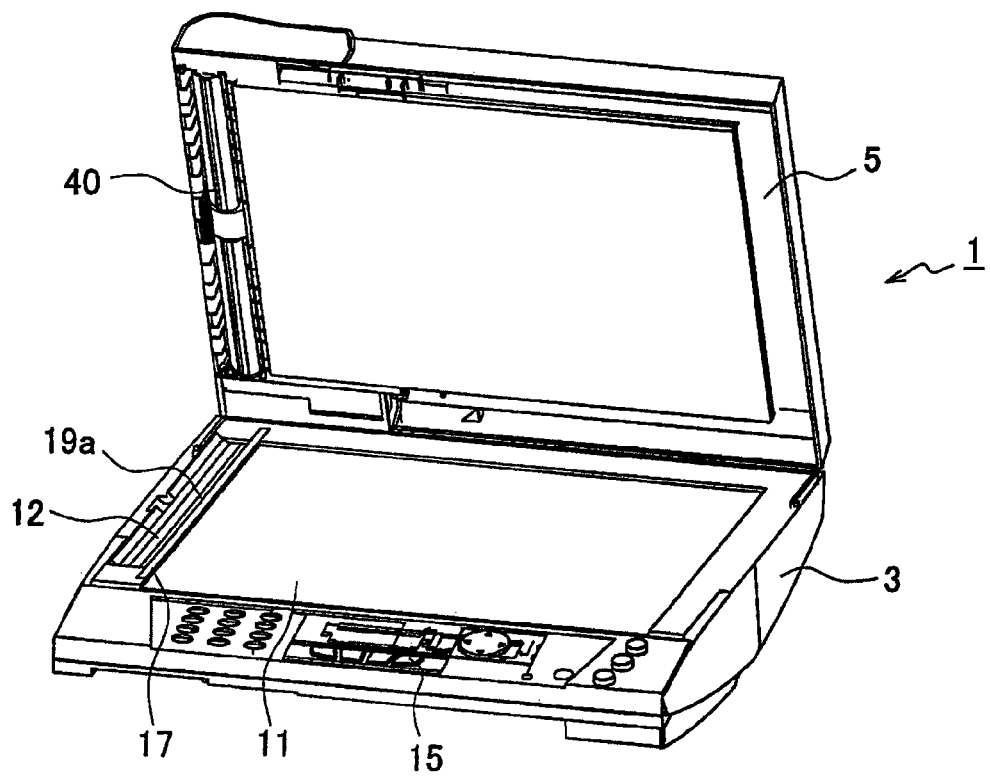
Figure 2:
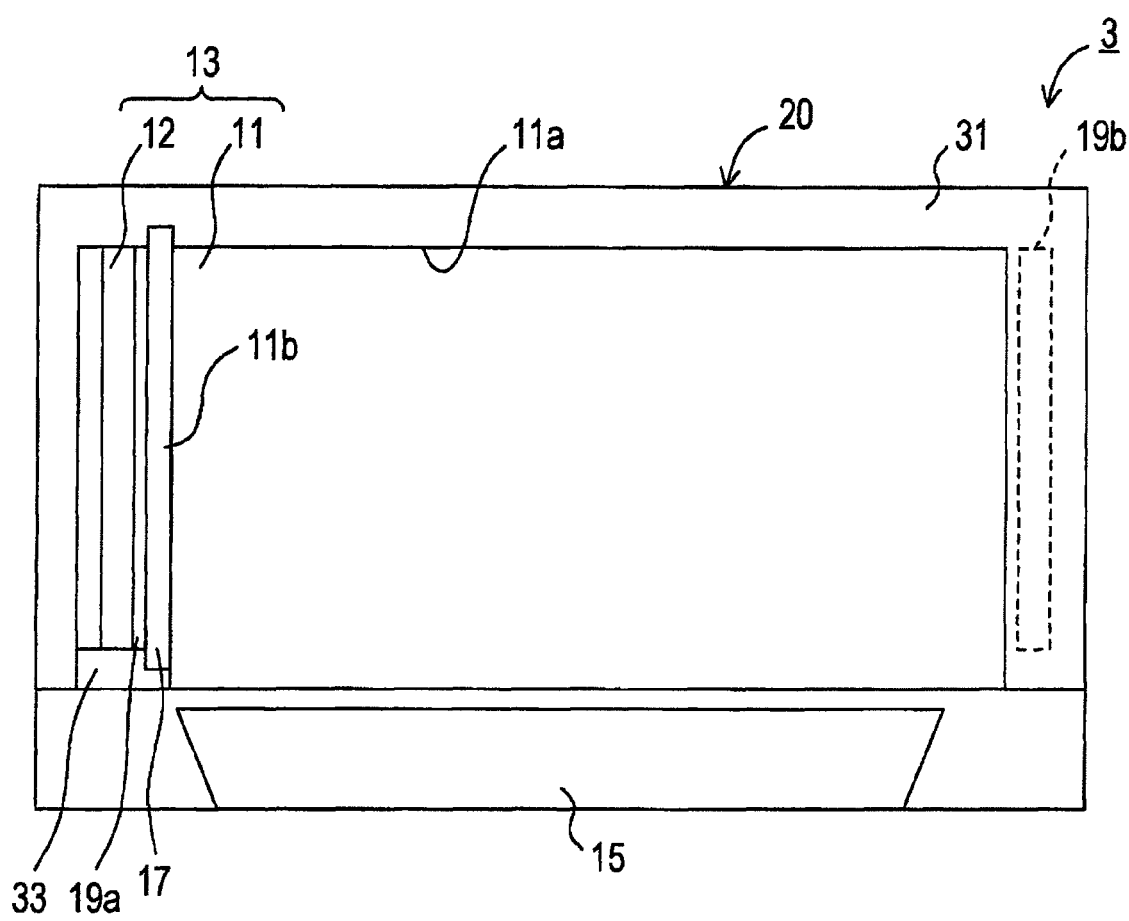
FIG. 2 is a plan view representing an upper configuration of an apparatus body in its image reading apparatus.

An upper surface of the apparatus body 3 is covered with the FB cover 5 in a state of closing the FB cover 5 as shown in FIG. 1A. In addition, FIG. 1A is an external appearance view representing a configuration of the image reading apparatus 1 in a state of closing the FB cover 5 and FIG. 1B is an external appearance view representing a configuration of the image reading apparatus 1 in a state of opening the FB cover 5. As shown in FIGS. 1A and 1B, the FB cover 5 is disposed openably and closably around a shaft of right and left directions (right and left directions in FIG. 1A).

As shown in FIG. 1, the apparatus body 3 comprises an operation part 15 comprising various switches in its front, and a user operates the operation part 15 and thereby, processing according to a command inputted from the operation part 15 is executed. Further, as shown in FIG. 2, the edge 11a (boundary with a frame part 31 described below) of the first reading surface 11 and the side near to a hinge of the FB cover 5 and the edge 11b (boundary with a positioning material 17 described below) of the side near to the second reading surface 12 respectively construct an original reference position becoming the reference of the placement position in the case of placing an original P (see FIG. 3A).

Figure 3A:
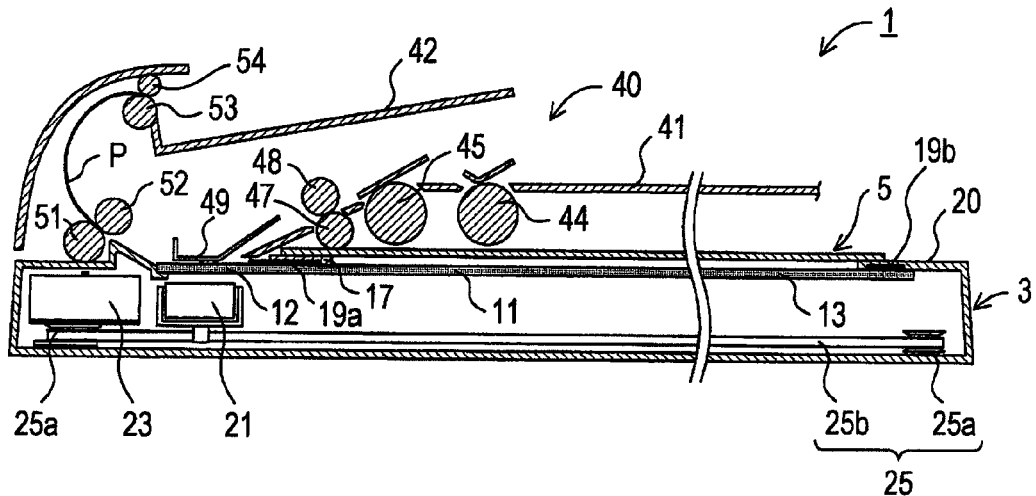
FIGS. 3A and 3B are schematic sectional views representing a configuration of a cross section along a longitudinal direction of its image reading apparatus.
Figure 3B:
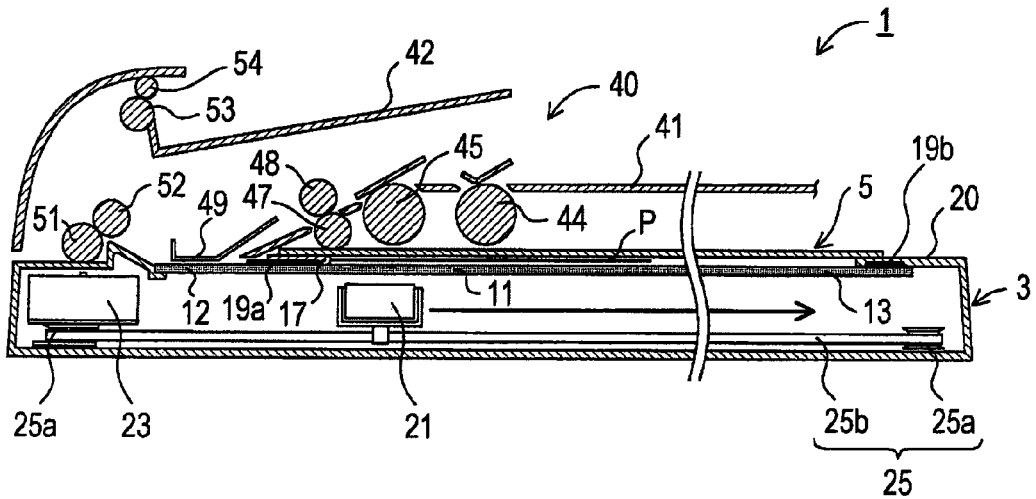

FIGS. 3A and 3B are schematic sectional views representing a configuration of a cross section along a longitudinal direction of the image reading apparatus 1. As shown in FIGS. 3A and 3B, the apparatus body 3 constructing the image reading apparatus 1 of the embodiment comprises platen glass 13 constructing the first reading surface 11 and the second reading surface 12, a cabinet 20 for supporting its platen glass 13, the positioning material 17 for positioning an original P placed on the first reading surface 11, a black reference member 19b, a white reference member 19a as one example of a reference member, a reading device 21, a belt mechanism part 25 and an FB motor 23 for moving the reading device 21 as described below.

As shown in FIG. 2, the right end (right side in FIG. 2) and the back end (upper side in FIG. 2) of the platen glass 13 supported by a glass support part (not shown) from the lower side are pressed from the upper side to the lower side by the frame part 31 extended toward the center in substantially parallel with a bottom surface of the cabinet 20 from the upper edge of the cabinet 20 and are fixed in the cabinet 20. The front left end of the platen glass 13 is pressed from the upper side to the lower side by a glass fixed part 33 extended from the edge of the front left end of the frame part 31 and is fixed so as not to peel from the cabinet 20.

In addition, a surface of the platen glass 13 is divided into the first reading surface 11 and the second reading surface 12 by the positioning material 17 disposed attachably to and detachably from the cabinet 20. The first reading surface 11 is a region for reading an original P placed on the surface by a user and is disposed in a right region of the image reading apparatus 1. On the other hand, the second reading surface 12 is a region for reading an original P conveyed by an original conveying device 40 disposed in the FB cover 5 and is disposed in a left region of the image reading apparatus 1.

The reading device 21 is received movably in right and left directions (a sub-scanning direction) in a back surface (that is, a back surface of the platen glass 13) of the first and second reading surfaces 11, 12 of the inside of the cabinet 20. As shown in FIGS. 3A and 3B, this reading device 21 is fixed in a belt 25b wound on a pair of rollers 25a which the belt mechanism part 25 comprises, and moves in the right and left directions of the image reading apparatus 1 together with the belt 25b rotating by power generated by the FB motor 23.

Figure 4:
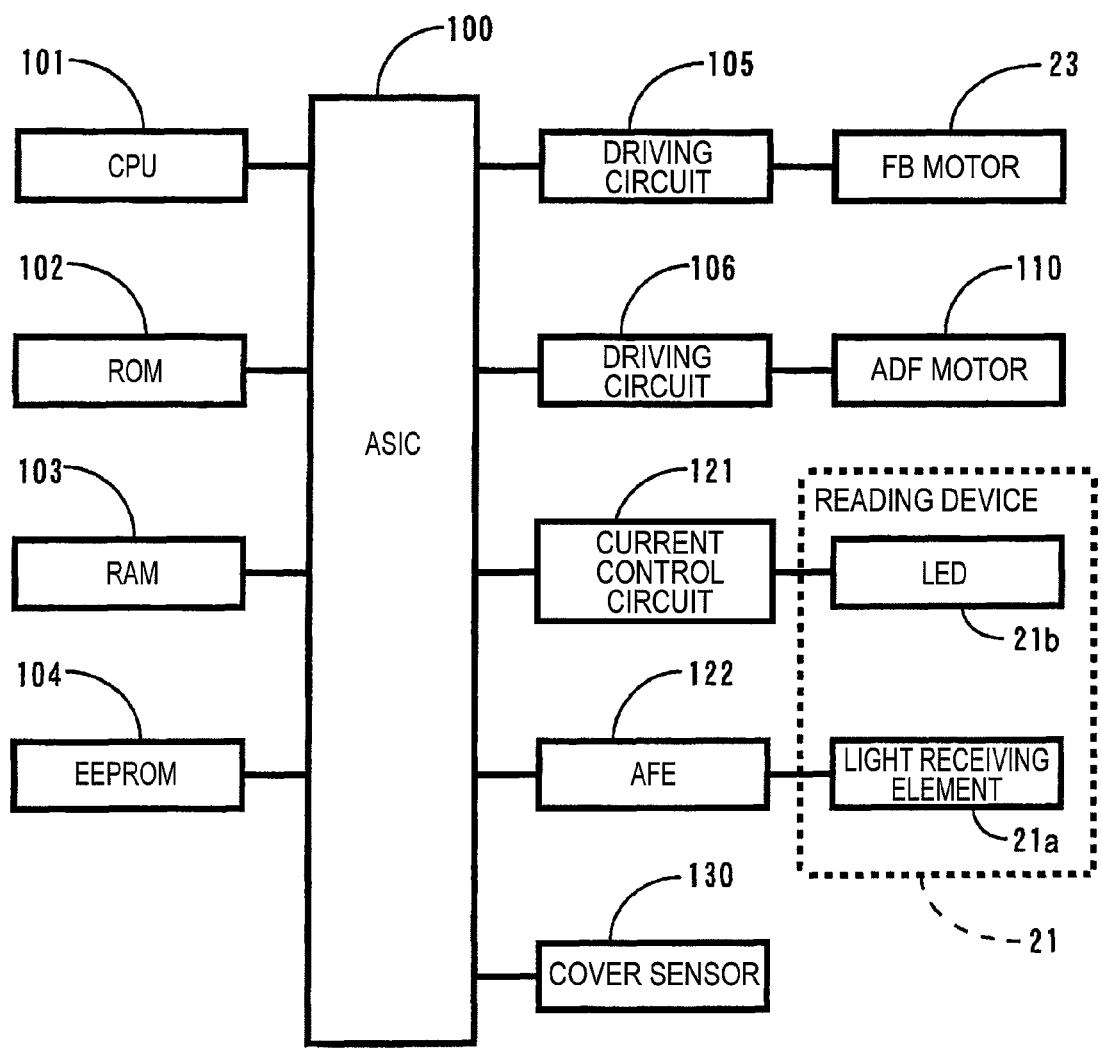
FIG. 4 is a block diagram representing a configuration of a control system of its image reading apparatus.

The reading device 21 is a well-known device comprising plural light receiving elements 21a as one example of an image reader arranged in a row in front and back directions (a main scanning direction) and plural LEDs 21b as one example of a light source arranged in a row in the front and back directions similarly (see FIG. 4 in both). The white reference member 19a is a thin-film band-shaped member extending in the front and back directions and arranged between the platen glass 13 and the positioning material 17, and is a member becoming a lightness reference of the light receiving elements 21a and colored in a white color. The black reference member 19b is a thin-film band-shaped member extending in the front and back directions and arranged between the platen glass 13 and the cabinet 20 (strictly, the frame part 31) as opposed to the right end of a movement range of the reading device 21, and is colored in a black color. It is constructed so that outside light from the outside of the image reading apparatus 1 does not reach an arrangement position of this black reference member 19b by the frame part 31 etc.

In addition, FIG. 3A is an explanatory diagram representing a fixed position of the reading device 21 in the case of reading an original P while conveying the original P targeted for reading on the second reading surface 12 using the original conveying device 40 disposed in the FB cover 5, and FIG. 3B is an explanatory diagram showing a scan form of the reading device 21 in the case of reading an original P placed on the first reading surface 11.

In the case of reading an original P conveyed on the second reading surface 12 by an action of the original conveying device 40 disposed in the FB cover 5, the reading device 21 is moved under the second reading surface 12 and is fixed. In the case of reading an original P on the first reading surface 11, the reading device 21 is moved in the right and left directions in the back surface side of the first reading surface 11 by an action of the belt mechanism part 25 and the FB motor 23.

The FB cover 5 comprises the original conveying device 40 as described above and in the following manner, an original P placed on a sheet feeding tray 41 is conveyed on the second reading surface 12 and the original P read by the reading device 21 on its second reading surface 12 is discharged to a sheet discharging tray 42.

The original conveying device 40 comprises sheet feeding rollers 44, 45 in a starting point of a conveyance path, and an original P placed on the sheet feeding tray 41 is conveyed in the downstream portion of the conveyance path by the sheet feeding rollers 44, 45. The original P conveyed by the sheet feeding rollers 44, 45 is further conveyed in the downstream portion of the conveyance path by conveying rollers 47, 48.

In the downstream side of the conveyance path by the conveying rollers 47, 48, an upper plate 49 opposed to its second reading surface 12 is disposed in a state of having a predetermined air gap with the second reading surface 12. An original P conveyed from the conveying rollers 47, 48 passes between this upper plate 49 and the second reading surface 12 and is conveyed by a pair of conveying rollers 51, 52 disposed in the downstream portion of the conveyance path further therefrom and is subsequently discharged to the sheet discharging tray 42 by a pair of sheet discharging rollers 53, 54.

(Control System of Image Reading Apparatus and its Processing)

FIG. 4 is a block diagram representing a configuration of a control system of the image reading apparatus 1. As shown in FIG. 4, the image reading apparatus 1 comprises a control circuit made by connecting a CPU 101, ROM 102, RAM 103 and EEPROM 104 to an ASIC (application specific integrated circuit) 100. An ADF motor 110 for driving various rollers 44 to 52 of the original conveying device 40 and the FB motor 23 described above are connected to the ASIC 100 through driving circuits 105, 106. The LEDs 21b of the reading device 21 are connected to the ASIC 100 through a current control circuit 121 and the light receiving elements 21a are connected to the ASIC 100 through an AFE (analog front-end IC) 122. The AFE 122 is constructed by including an A/D (Analog/Digital) conversion circuit. Further, a well-known cover sensor 130 (one example of cover opening and closing detector) for detecting opening and closing of the FB cover 5 is connected to the ASIC 100.

Figure 5:
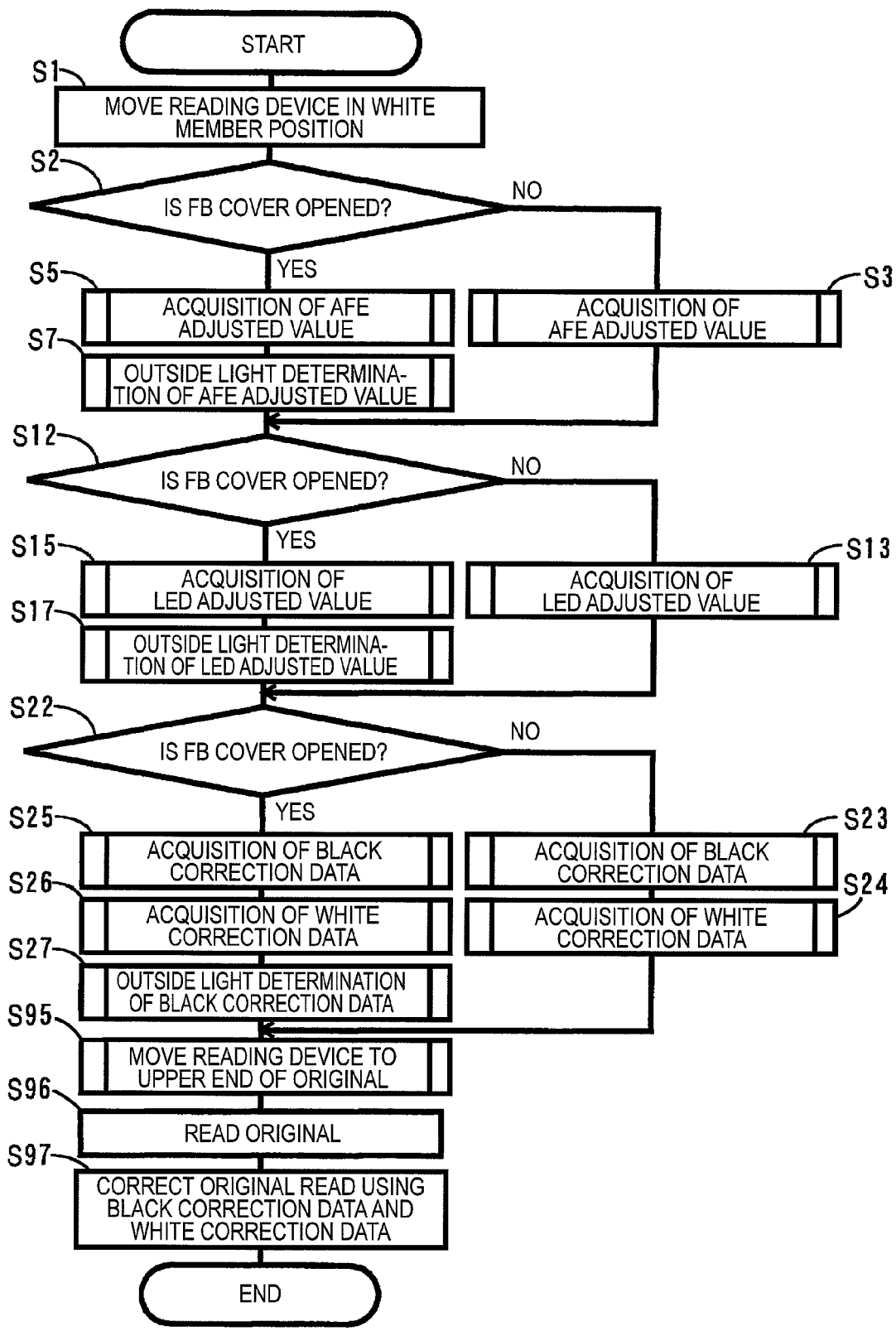
FIG. 5 is a flowchart representing a main routine of processing in its control system.

Next, processing executed by this ASIC 100 and the CPU 101 based on a program stored in the ROM 102 will be described. FIG. 5 is a flowchart representing a main routine of processing executed at the time of instructing reading of an image of an original P placed on the first reading surface 11 through the operation part 15.

As shown in FIG. 5, in this processing, the reading device 21 is first moved in a position (hereinafter also called a white member position) opposed to the white reference member 19a by driving the FB motor 23 in S1 (S represents a step: the same applies hereinafter). In the next S2, it is decided whether or not the FB cover 5 is opened through the cover sensor 130. When the FB cover 5 is closed (S2: N), the processing proceeds to S3 and the following AFE adjusted value acquiring processing is executed.

Figure 6:
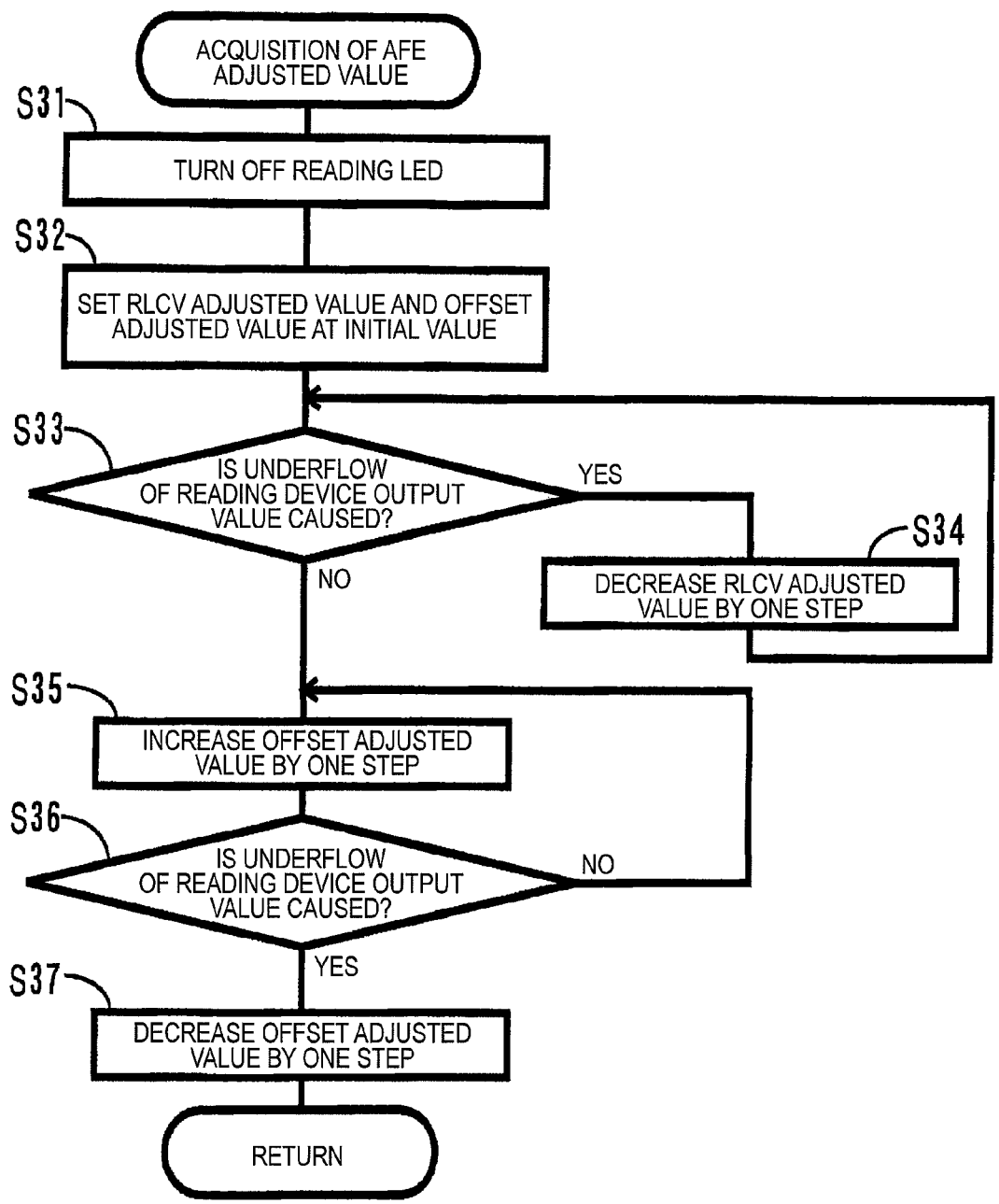
FIG. 6 is a flowchart representing AFE adjusted value acquiring processing in its processing.

FIG. 6 is a flowchart representing processing for acquiring an AFE adjusted value for adjusting a reference voltage of the A/D conversion circuit built into the AFE in detail. The reference voltage (hereinafter called a reference voltage of the AFE) of the A/D conversion circuit built into the AFE refers to a value becoming zero when AD conversion of an output value of the light receiving element 21a is made. As shown in FIG. 6, in this processing, all the LEDs 21b (reading LEDs) of the reading device 21 are first turned off in S31 and in the next S32, an OFFSET adjusted value and an RLCV adjusted value which are the AFE adjusted value are set at an initial value. In the next S33, it is decided whether or not an underflow of an output value (hereinafter also called a reading device output value) in which AD conversion of the light receiving element 21a acquired through the AFE 122 is made is caused even partially. When the underflow of the reading device output value is caused (S33: Y), the RLCV adjusted value is decreased by one step in S34 and the processing proceeds to S33 again.

Then, when the underflow of the reading device output value is not caused by repeats of this processing of S33, S34 (S33: N), after the OFFSET adjusted value is increased by one step in S35, the processing proceeds to S36. In S36, it is decided whether or not an underflow of a reading device output value at that point in time is caused even partially, and when the underflow is not caused (S36: N), the processing proceeds to S35 again. Then, when the underflow of the reading device output value is caused by repeats of this processing of S35, S36 (S36: Y), after the OFFSET adjusted value is decreased by one step in S37, a reference voltage of the AFE is defined by the OFFSET adjusted value and the RLCV adjusted value. This AFE adjusted value acquiring processing is ended and the processing proceeds to S12 of FIG. 5.

Figure 7A:
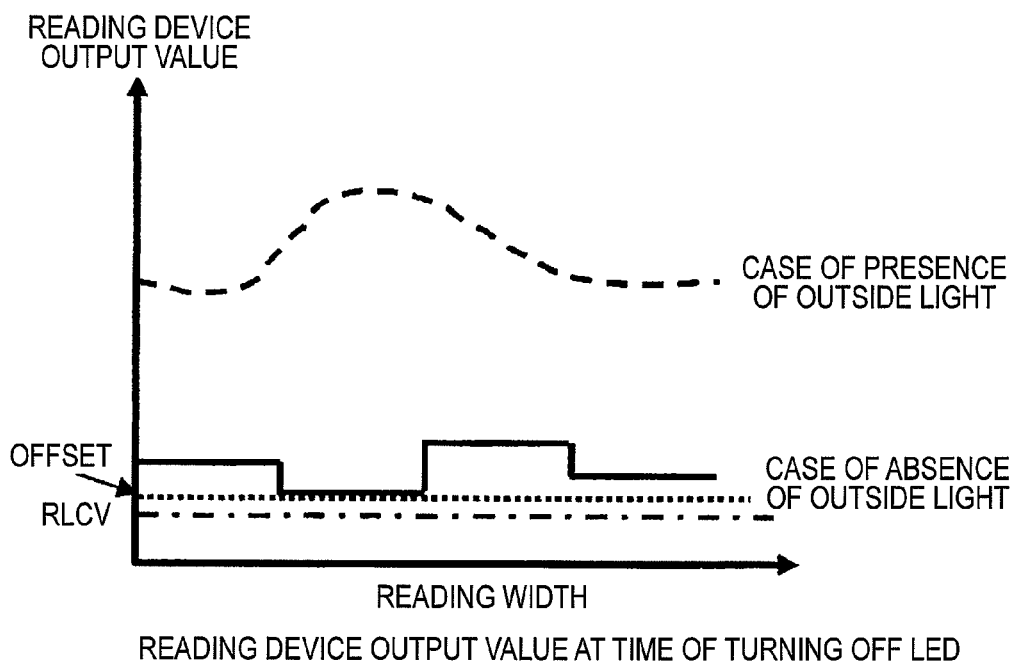
FIGS. 7A and 7B are explanatory diagrams representing an influence of outside light and an outline of its AFE adjusted value acquiring processing.

When outside light does not enter the vicinity of the white reference member 19a from the outside of the image reading apparatus 1, a reading device output value at the time of turning off the LED 21b is shown by, for example, a solid line in FIG. 7(a). In the AFE adjusted value acquiring processing, the RLCV adjusted value is coarsely adjusted and fine adjustment is further made by the OFFSET adjusted value so that the reading device output value at this time can be read barely without causing an underflow through the AFE 122.

Returning to FIG. 5, on the other hand, in the case of deciding that the FB cover 5 is opened in S2 (S2: Y), the processing proceeds to S5 and AFE adjusted value acquiring processing similar to that of S3 is executed as one example of dark output adjusted value acquiring unit and the following outside light determining processing of an AFE adjusted value is further executed in S7.

Figure 8:
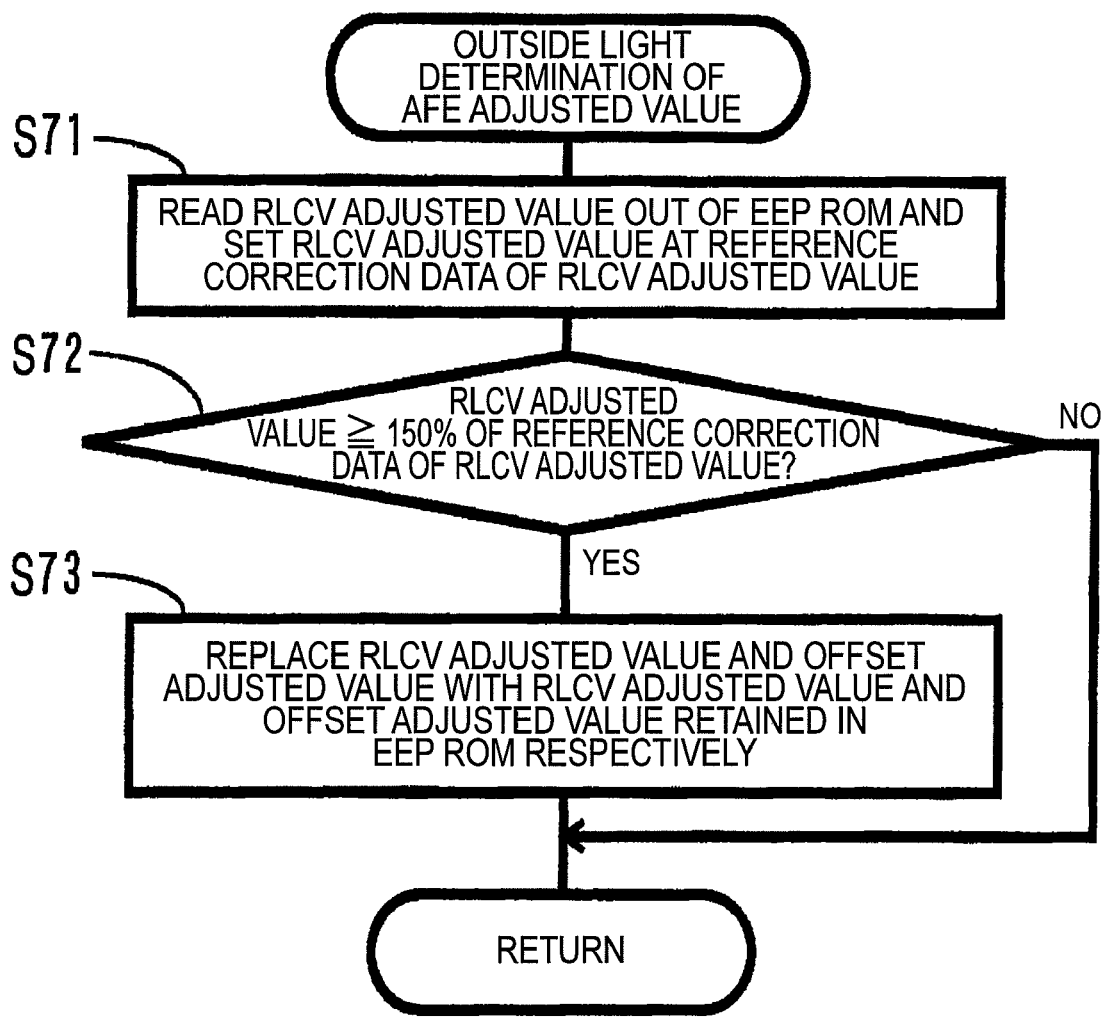
FIG. 8 is a flowchart representing outside light determining processing of an AFE adjusted value in the main routine.

FIG. 8 is a flowchart representing the outside light determining processing of this AFE adjusted value in detail. As shown in FIG. 8, in this processing, an RLCV adjusted value previously retained at the time of factory shipment is first read out of the EEPROM 104 and its value is set at reference correction data of the RLCV adjusted value in S71. In the next S72 as one example of third outside light deciding unit, it is decided whether or not the RLCV adjusted value acquired in S5 is more than or equal to 150% of the reference correction data of the RLCV adjusted value acquired in S71, and when the RLCV adjusted value is less than 150% (S72: N), the processing proceeds to S12 of FIG. 5 as it is. On the other hand, when the RLCV adjusted value acquired in S5 is more than or equal to 150% of the reference correction data, it is decided that an influence of outside light is suffered (S72: Y), in S73 as one example of dark output adjusted value modifying unit, the OFFSET adjusted value and the RLCV adjusted value acquired in S5 are respectively replaced with an OFFSET adjusted value and an RLCV adjusted value previously retained in the EEPROM 104 at the time when the influence of outside light is not suffered, and the processing proceeds to S12 of FIG. 5. In addition, the OFFSET adjusted value and an RLCV adjusted value retained in the EEPROM 104 are properly defined in consideration of output adjustment etc. of the reading device 21 so as not to suffer the influence of outside light. For example, an OFFSET adjusted value and an RLCV adjusted value acquired in a state of closing the FB cover 5 at the time of manufacture or factory shipment are inputted and set in the EEPROM 104. That is, as shown by a broken line in FIG. 7A, when outside light enters the vicinity of the white reference member 19a, a reading device output value at the time of turning off the LED 21b becomes abnormally high and when an RLCV adjusted value also becomes high accordingly, a reference voltage of the AFE also becomes high. When the reference voltage of the AFE becomes high, a range of an output value of the light receiving element 21a becomes narrow. As a result of that, when the reference voltage of the AFE is defined using a predetermined RLCV adjusted value and an OFFSET adjusted value at the time when the influence of outside light is not suffered, the range of the output value of its light receiving element is ensured widely, so that the influence of outside light can be reduced. Therefore, when an RLCV adjusted value becomes more than or equal to 1.5 times the predetermined RLCV adjusted value retained in the EEPROM 104 at the time when the influence of outside light is not suffered (S72: Y), it is decided that the influence of outside light is reflected in the OFFSET adjusted value and the RLCV adjusted value acquired in S5, and their values are modified to the OFFSET adjusted value and the RLCV adjusted value at the time when the influence of outside light is not suffered. Returning to FIG. 5, in S12, it is decided whether or not the FB cover 5 is opened through the cover sensor 130 like S2, and when the FB cover 5 is closed (S12: N), the processing proceeds to S13 and the following LED adjusted value acquiring processing is executed.

Figure 9:
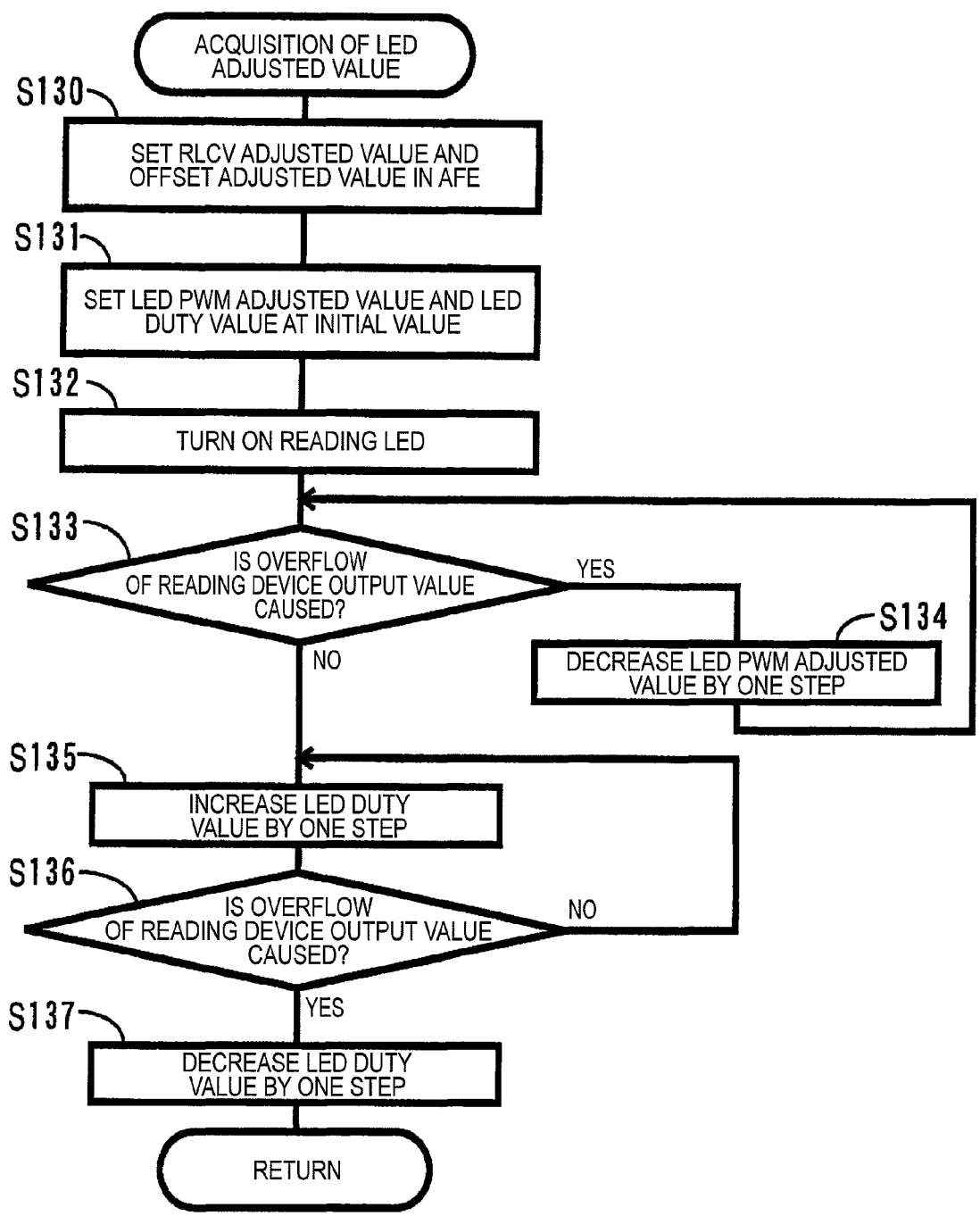
FIG. 9 is a flowchart representing LED adjusted value acquiring processing in the main routine.

FIG. 9 is a flowchart representing this LED adjusted value acquiring processing in detail. As shown in FIG. 9, in this processing, the OFFSET adjusted value and the RLCV adjusted value replaced or acquired in any of S3 to S7 are first set in the AFE 122 and a reference voltage of the AFE is defined in S130. In the next S131, an LEDDUTY value and an LEDPWM adjusted value for adjusting a light amount of the LED 21b are set at initial values. That is, the ASIC 100 outputs a PWM signal of a predetermined duty ratio (LEDPWM adjusted value) to the current control circuit 121 at the time of turning on the LED 21b. Then, a voltage in which this PWM signal is smoothed is applied to the LED 21b, and the LED 21b is turned on for only a certain time every one line at a predetermined duty ratio (LEDDUTY value). In S131, the LEDDUTY value and this LEDPWM adjusted value are set at the initial values.

In the next S132, all the LEDs 21b (reading LEDs) of the reading device 21 are turned on and in S133, it is decided whether or not an overflow of a reading device output value at that point in time is caused even partially. When the overflow of the reading device output value is caused (S133: Y), the LEDPWM adjusted value is decreased by one step in S134 and the processing proceeds to S133 again.

Then, when the overflow of the reading device output value is not caused by repeats of this processing of S133, S134 (S133: N), after the LEDDUTY value is increased by one step in S135, the processing proceeds to S136. In S136, it is decided whether or not an overflow of a reading device output value at that point in time is caused even partially, and when the overflow is not caused (S136: N), the processing proceeds to S135 again. Then, when the overflow of the reading device output value is caused by repeats of this processing of S135, S136 (S136: Y), after the LEDDUTY value is decreased by one step in S137, this LED adjusted value acquiring processing is ended and the processing proceeds to S22 of FIG. 5. That is, in the LED adjusted value acquiring processing, the LEDPWM adjusted value is coarsely adjusted and fine adjustment is further made by the LEDDUTY value so that the reading device output value at the time of turning on the LED 21b can be read barely without causing an overflow.

Returning to FIG. 5, on the other hand, in the case of deciding that the FB cover 5 is opened in S12 (S12: Y), the processing proceeds to S15 and LED adjusted value acquiring processing similar to that of S13 is executed as one example of light source adjusted value acquiring unit and the following outside light determining processing of an LED adjusted value is further executed in S17.

FIG. 10 is a flowchart representing the outside light determining processing of this LED adjusted value in detail. As shown in FIG. 10, in this processing, an LEDPWM adjusted value previously retained at the time of factory shipment is first read out of the EEPROM 104 and its value is set at reference correction data of the LEDPWM adjusted value in S171. In the next S172 as one example of first outside light deciding unit, it is decided whether or not the LEDPWM adjusted value acquired in S15 is less than or equal to 80% of the reference correction data of the LEDPWM adjusted value acquired in S171, and when the LEDPWM adjusted value is more than 80% (S172: N), the processing proceeds to S22 of FIG. 5 as it is. On the other hand, when the LEDPWM adjusted value acquired in S15 is less than or equal to 80% of the reference correction data (S172: Y), in S173 as one example of light source adjusted value modifying unit, the LEDDUTY value and the LEDPWM adjusted value acquired in S15 are respectively replaced with an LEDDUTY value and an LEDPWM adjusted value previously retained in the EEPROM 104, and the processing proceeds to S22 of FIG. 5.

Figure 7B:
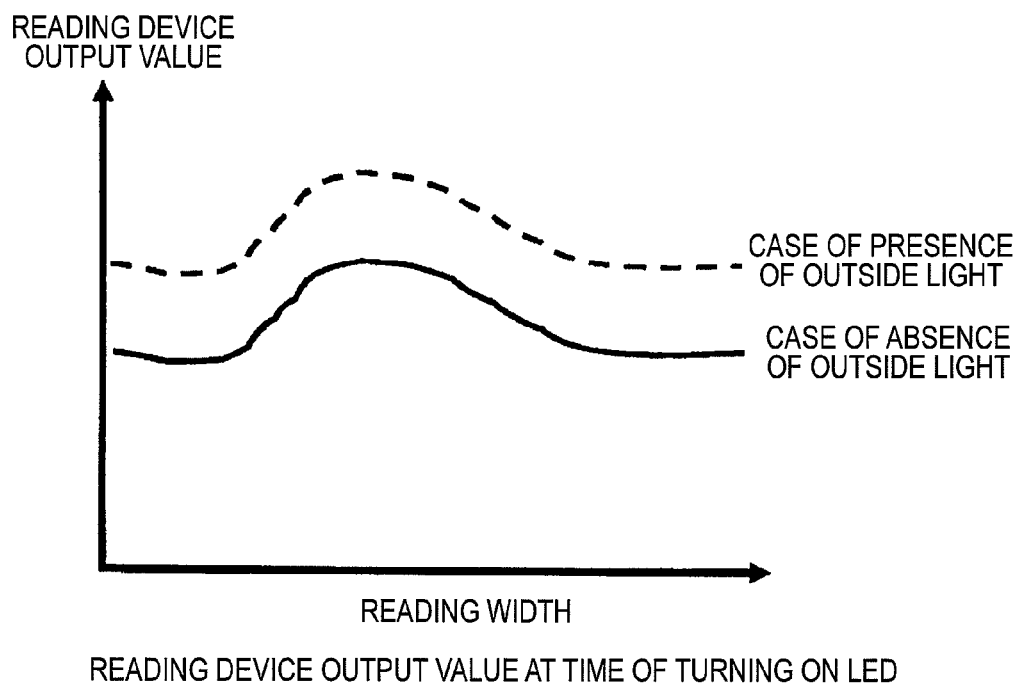

That is, when outside light does not enter the vicinity of the white reference member 19a from the outside of the image reading apparatus 1, a reading device output value at the time of turning on the LED 21b most intensively is shown by, for example, a solid line in FIG. 7B. On the other hand, when outside light enters the vicinity of the white reference member 19a, a reading device output value at the time of turning on the LED 21b most intensively becomes abnormally high as shown by a broken line in FIG. 7B and accordingly, a small value is acquired as an LEDPWM adjusted value. The outside light does not enter the first reading surface 11 uniformly and the incident amount of the outside light varies according to a place of its reading surface. As a result of that, by entrance of the outside light, a certain place of the reading surface 11 has the light amount sufficient to be read by the reading device 21, but there are cases where a certain place of the reading surface 11 with small entrance of the outside light does not have the light amount sufficient to be read by the reading device 21. Then, when the reading device 21 reads by a value in which a DUTY value and an LEDPWM adjusted value which is an adjusted value of the light amount of the LED 21b are small, there is a possibility that the reading device 21 cannot read since the certain place of the reading surface 11 with small entrance of the outside light does not have a sufficient light amount. Therefore, when an LEDPWM adjusted value becomes less than or equal to 0.8 time the predetermined LEDPWM adjusted value retained in the EEPROM 104 at the time when an influence of outside light is not suffered (S172: Y), it is decided that the influence of outside light is reflected in the LEDDUTY value and the LEDPWM adjusted value acquired in S15, and their values are modified to the DUTY value and the predetermined LEDPWM adjusted value at the time when the influence of outside light is not suffered.

In addition, the DUTY value and the LEDPWM value retained in the EEPROM 104 are properly defined in consideration of output adjustment etc. of the reading device 21 so as not to suffer the influence of outside light like the OFFSET adjusted value and the RLCV adjusted value described above. For example, at the time of manufacture or factory shipment, the values are inputted and set in the EEPROM 104 like the time of the AFE adjusted value.

Returning to FIG. 5, in S22, it is decided whether or not the FB cover 5 is opened through the cover sensor 130 like S2, and when the FB cover 5 is closed (S22: N), the processing proceeds to S23, S24 sequentially, and the following black correction data acquiring processing and white correction data acquiring processing are executed sequentially.

FIG. 11 is a flowchart representing the black correction data acquiring processing of S23 in detail. As shown in FIG. 11, in this processing, all the LEDs 21b (reading LEDs) of the reading device 21 are first turned off in S230. In the next S231, a reading device output value (each of the output values of all the light receiving elements 21a) at that point in time is retained in the EEPROM 104 as black correction data and this black correction data acquiring processing is ended and the processing proceeds to S24 of FIG. 5.

FIG. 12 is a flowchart representing the white correction data acquiring processing of S24 in detail. As shown in FIG. 12, in this processing, all the LEDs 21b (reading LEDs) of the reading device 21 are first turned on by the LEDDUTY value and the LEDPWM adjusted value replaced or acquired in any of S13 to S17 in S240. In the next S241, a reading device output value (each of the output values of all the light receiving elements 21a) at that point in time is retained in the EEPROM 104 as white correction data and this white correction data acquiring processing is ended and the processing proceeds to S95 of FIG. 5.

Returning to FIG. 5, on the other hand, in the case of deciding that the FB cover 5 is opened in S22 (S22: Y), the processing proceeds to S25, S26 and black correction data acquiring processing (one example of black correction data acquiring unit) and white correction data acquiring processing (one example of white correction data acquiring unit) similar to those of S23, S24 are executed and the following outside light determining processing of black correction data is further executed in S27.

Figure 13:
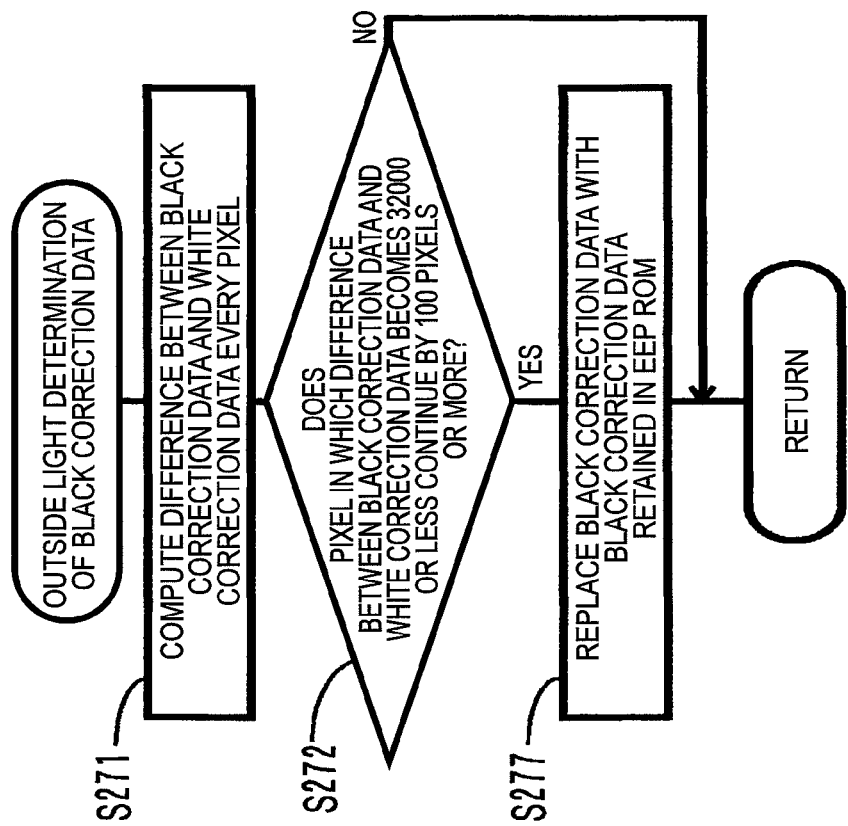
FIG. 13 is a flowchart representing outside light determining processing of black correction data in the main routine.

FIG. 13 is a flowchart representing the outside light determining processing of this black correction data in detail. As shown in FIG. 13, in this processing, a difference between black correction data and white correction data every pixel is first computed based on the white correction data and the black correction data acquired in S25, S26 in S271. In the next S272 as one example of second outside light deciding unit, it is decided whether or not a pixel in which the difference between black correction data and white correction data becomes 32000 or less (an output of the AFE 122 changes from 0 to 65000) continues by 100 pixels or more. When such a pixel does not continue by 100 pixels or more (S272: N), the processing proceeds to S95 of FIG. 5 as it is. On the other hand, when the pixel in which the difference between black correction data and white correction data becomes 32000 or less continues by 100 pixels or more (S272: Y), the reading device 21 is moved in a position (black member position) opposed to the black reference member 19b in S273. In the next S275, black correction data acquiring processing (black correction data reacquiring unit) similar to that of S23 is executed in its position and the black correction data acquired in S25 is replaced with the black correction data obtained in its processing (one example of black correction data modifying unit) and the processing proceeds to S95 of FIG. 5.

Returning to FIG. 5, the reading device 21 is moved to the upper end of an original P, that is, the left end of the first reading surface 11 in S95, and well-known original reading processing for reading an image of the original P by one line while moving the reading device 21 is executed in the next S96. Further, in the next S97 as one example of reading result correcting unit, image data of the original P read by the processing of S96 is corrected using the black correction data and the white correction data replaced or acquired in any of S23 to S27 and the processing is ended. Correcting the image data of its original P by using the black correction data and the white correction data is to subtract the black correction data from a reading device output value in which the original is read and further make a shading correction from a difference between the black correction data and the white correction data.

Effect of Embodiment and its Modified Example

In the image reading apparatus 1 of the embodiment as described above, the presence or absence of outside light is individually decided (S72, S172, S272) with respect to each of the time of executing the AFE adjusted value acquiring processing (S5), the time of executing the LED adjusted value acquiring processing (S15) and the time of executing the black correction data acquiring processing (S25), and when the outside light is present, modification to a predetermined value or a reacquired value is made (S73, S173, S275). As a result of this, even when an incident state of outside light changes at the time of acquiring each of the parameters, it can properly be switched whether or not their parameters are replaced with the predetermined value or the reacquired value. Moreover, in the embodiment, when an influence of outside light is reflected in black correction data (S272: Y), the black correction data is reacquired after the reading device 21 is moved to a position in which the influence of outside light is not suffered, so that it can cope well with a secular change etc. in the reading device 21.

Further, in the embodiment, the outside light determining processing (S7) of an AFE adjusted value, the outside light determining processing (S17) of an LED adjusted value and the outside light determining processing (S27) of black correction data are omitted by considering that entrance of outside light is absent when the FB cover 5 is closed, so that the processing can be speeded up. Moreover, decisions (S2, S12, S22) as to whether or not the FB cover 5 is closed are executed with respect to each of the time of executing the AFE adjusted value acquiring processing (S3 or S5), the time of executing the LED adjusted value acquiring processing (S13 or S15) and the time of executing the black correction data acquiring processing (S23 or S25), so that proper processing can be executed even when the FB cover 5 is opened or closed during the processing of FIG. 5. In the embodiment, when outside light does not enter at the time of executing the black correction data acquiring processing (S25) (S272: N), it is unnecessary to move the reading device 21 during execution of the processing of S2 to S27, so that the processing can be speeded up further.

Figure 14:
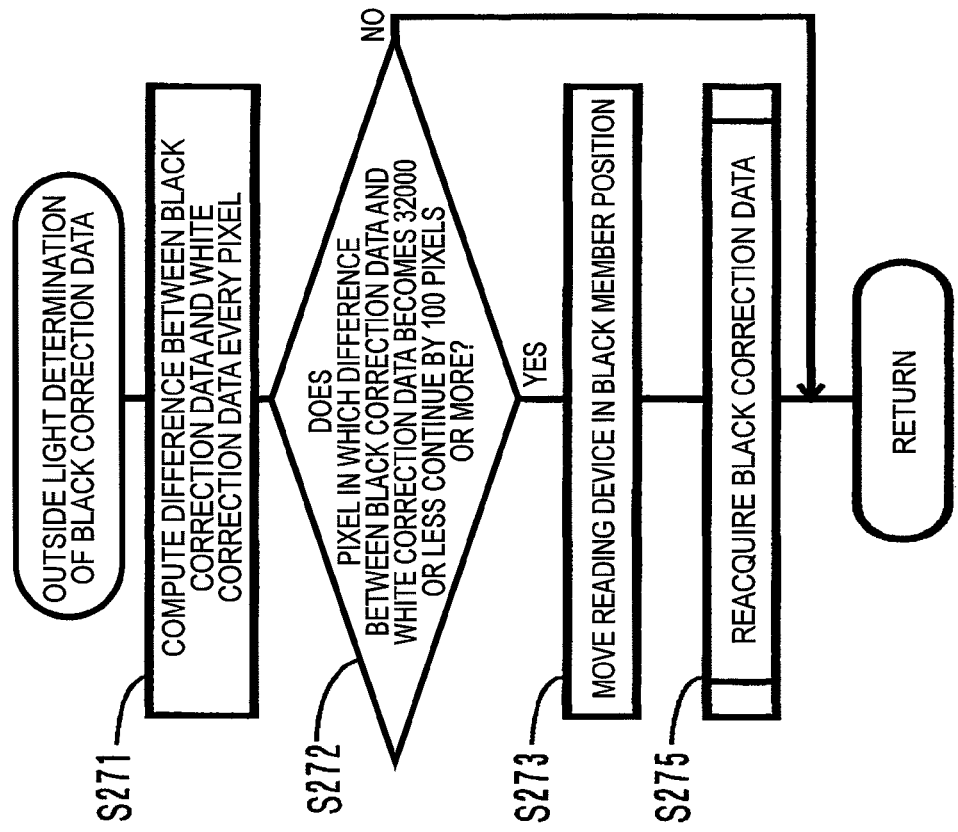
FIG. 14 is a flowchart representing a modified example of outside light determining processing of its black correction data.

In addition, the invention is not limited to the embodiment described above, and can be implemented in various forms without departing from the gist of the invention. For example, in the embodiment, when an influence of outside light is reflected in black correction data (S272: Y), the black correction data is reacquired (S273, S275), but the black correction data may be replaced with a predetermined value like an AFE adjusted value and an LED adjusted value. FIG. 14 is a flowchart representing the outside light determining processing of black correction data corresponding to such an embodiment. This processing differs from the processing of FIG. 13 in only processing of the case of making the decision of yes in S272 described above, so that only a difference will hereinafter be described.

As shown in FIG. 14, in this processing, when a pixel in which a difference between black correction data and white correction data becomes 32000 or less continues by 100 pixels or more (S272: Y), the processing proceeds to S277 as one example of black correction data modifying unit. In S277, the black correction data acquired in S25 is replaced with black correction data previously retained in the EEPROM 104 at the time when an influence of outside light is not suffered, and the processing proceeds to S95 of FIG. 5.

In other words, the reason why the black correction data is replaced with the black correction data at the time when the influence of outside light is not suffered is because when black correction data at the time of suffering the influence of outside light is used, a value after correction of a reading device output value in which an original is read becomes small even in a place in which the influence of outside light is not suffered when the black correction data is subtracted from the reading device output value in the case of correcting the original using the black correction data. However, when the predetermined black correction data at the time when the influence of outside light is not suffered is used, the value after correction of the reading device output value in which the original is read does not become small as a result of subtraction by the black correction data even in the place in which the influence of outside light is not suffered. As a result of that, the influence of outside light can be reduced.

In addition, the black correction data retained in the EEPROM 104 at the time when the influence of outside light is not suffered is properly defined in consideration of output adjustment etc. of the reading device 21 so as not to suffer the influence of outside light. For example, at the time of manufacture or factory shipment, the data is inputted and set in the EEPROM 104 like the time of the AFE adjusted value.

Then, even when an incident state of outside light changes at the time of acquiring each of the parameters, it can properly be switched whether or not their parameters are replaced with a predetermined value. Moreover, in the embodiment, it is unnecessary to move the reading device 21 since black correction data is reacquired, so that the processing can be speeded up further.

A circuit can be constructed without using the AFE 122 and in that case, the processing of S2 to S7 can be omitted. Further, the invention can be applied to an image reading apparatus of any type of CIS and CCD, and various means such as a light guiding plate or CCFL can also be applied as a light source, and a predetermined value in which the replacement described above is performed may be a value learned by the past control.

What is claimed is:

1. An image reading apparatus comprising:
an original placement table on which an original is to be placed;
a light source which irradiates the original placed on the original placement table with light;
an image reader which reads an image of the original based on light reflected from the original when the original is irradiated by the light source;
a reference member used as a lightness reference of the image reader;
an adjusted value acquiring unit which acquires a light source adjusted value for adjusting the light source based on a read result at the time when the image reader reads light reflected from the reference member irradiated by the light source;
a white correction data acquiring unit which acquires, as white correction data, a read result at the time when the image reader reads the light reflected from the reference member irradiated by the light source which is adjusted by the light source adjusted value;
a black correction data acquiring unit which acquires, as black correction data, a read result at the time when the image reader reads the light reflected from the reference member at the time of turning off the light source;
a first outside light deciding unit which decides whether outside light entering the original table is present or absent based on the light source adjusted value;
an adjusted value modifying unit which modifies the light source adjusted value from the light source adjusted value acquired by the adjusted value acquiring unit to a predetermined light source adjusted value when the first outside light deciding unit decides that the outside light is present;
a second outside light deciding unit which decides whether outside light entering the original table is present or absent based on the white correction data and the black correction data;
a black correction data modifying unit which modifies the black correction data from black correction data acquired by the black correction data acquiring unit to predetermined black correction data when the second outside light deciding unit decides that the outside light is present, and does not modify the black correction data when the second outside light deciding unit decides that the outside light is absent; and a read result correcting unit which corrects a read result in which the image reader reads the light reflected by the original based on the white correction data and the black correction data output from the black correction data modifying unit.

2. The image reading apparatus according to claim 1 further comprising:

a cover with which the original placed on the original placement table is covered; and a cover opening and closing detector which detects opening and closing of the cover, wherein the first outside light deciding unit decides whether the outside light is present or absent when the cover opening and closing detector detects opening of the cover at the time of acquiring the read result to which the adjusted value acquiring unit refers, and wherein the second outside light deciding unit decides whether the outside light is present or absent when the cover opening and closing detector detects opening of the cover at the time of acquiring the read result to which the black correction data acquiring unit refers.

3. The image reading apparatus according to claim 1 further comprising:

a dark output adjusted value acquiring unit which acquires a dark output adjusted value by adjusting the image reader such that a read result at the time when the image reader reads light reflected from the reference member at the time of turning off the light source becomes a minimum value;

a third outside light deciding unit which decides whether outside light entering the original table is present or absent based on the dark output adjusted value; and a dark output adjusted value modifying unit which modifies the dark output adjusted value from the dark output adjusted value acquired by the dark output adjusted value acquiring unit to a predetermined dark output adjusted value when the third outside light deciding unit decides that the outside light is present, and does not modify the dark output adjusted value when the third outside light deciding unit decides that the outside light is absent, wherein the adjusted value acquiring unit acquires the light source adjusted value based on the read result of the image reader adjusted based on the dark output adjusted value from the dark output adjusted value modifying unit.

4. An image reading apparatus comprising:

an original placement table on which an original is to be placed;

a light source which irradiates the original placed on the original placement table with light;

an image reader which reads an image of the original based on light reflected by the original when the original is irradiated by the light source;

a reference member used as a lightness reference of the image reader;

a adjusted value acquiring unit which acquires a light source adjusted value for adjusting the light source based on a read result at the time when the image reader reads light reflected from the reference member when the reference member is irradiated by the light source;

a white correction data acquiring unit which acquires, as white correction data, a read result at the time when the image reader reads the light reflected from the reference member when the reference member is irradiated by the light source adjusted by the light source adjusted value;

a black correction data acquiring unit which acquires, as black correction data, a read result at the time when the image reader reads the light reflected from the reference member at the time of turning off the light source;

a first outside light deciding unit which decides whether outside light entering the original table is present or absent based on the light source adjusted value acquired by the adjusted value acquiring unit;

a light source adjusted value modifying unit which modifies the light source adjusted value from the light source adjusted value acquired by the light source adjusted value acquiring unit to a predetermined light source adjusted value when the first outside light deciding unit decides that the outside light is present;

a second outside light deciding unit which decides whether outside light entering the original table is present or absent based on white correction data acquired by the white correction data acquiring unit and the black correction data acquired by the black correction data acquiring unit;

a black correction data reacquiring unit which reacquires, as the black correction data, the read result of the image reader obtained at the time of turning off the light source after the image reading unit is moved to a position in which an influence of outside light is not suffered when the second outside light deciding unit decides that the outside light is present;

a black correction data modifying unit which modifies the black correction data from black correction data acquired by the black correction data acquiring unit to black correction data reacquired by the black correction data reacquiring unit when the second outside light deciding unit decides that the outside light is present and does not modify the black correction data when the outside light is absent; and a read result correcting unit which corrects the read result in which the image reader reads reflected light reflected by the original based on the white correction data and the black correction data output from the black correction data modifying unit.

5. The image reading apparatus according to claim 4 further comprising:

a cover with which the original placed on the original placement table is covered; and a cover opening and closing detector which detects opening and closing of the cover, wherein the first outside light deciding unit decides whether the outside light is present or absent when the cover opening and closing detector detects opening of the cover at the time of acquiring the read result to which the adjusted value acquiring unit refers, and wherein the second outside light deciding unit decides whether the outside light is present or absent when the cover opening and closing detector detects opening of the cover at the time of acquiring the read result to which the black correction data acquiring unit refers.

6. The image reading apparatus according to claim 4 further comprising:

a dark output adjusted value acquiring unit which acquires a dark output adjusted value by adjusting the image reader such that a read result at the time when the image reader reads light reflected from the reference member at the time of turning off the light source becomes a minimum value;

a third outside light deciding unit which decides whether outside light entering the original table is present or absent based on the dark output adjusted value; and a dark output adjusted value modifying unit which modifies the dark output adjusted value from the dark output adjusted value acquired by the dark output adjusted value acquiring unit to a predetermined dark output adjusted value when the third outside light deciding unit decides that the outside light is present, and does not modify the dark output adjusted value when the third outside light deciding unit decides that the outside light is absent, wherein the adjusted value acquiring unit acquires the light source adjusted value based on the read result of the image reader adjusted based on the dark output adjusted value from the dark output adjusted value modifying unit.

* * * * *